(12) United States Patent
Gumley

(10) Patent No.: US 6,320,119 B1
(45) Date of Patent: Nov. 20, 2001

(54) LIGHTNING AIR TERMINALS AND METHOD OF DESIGN AND APPLICATION

(75) Inventor: John Richard Gumley, Tasmania (AU)

(73) Assignee: Erico International Corporation, Solon, OH (US)

( * ) Notice: Subject to any disclaimer, the term of this patent is extended or adjusted under 35 U.S.C. 154(b) by 0 days.

(21) Appl. No.: 09/361,374

(22) Filed: Jul. 26, 1999

Related U.S. Application Data
(60) Provisional application No. 60/094,280, filed on Jul. 27, 1998.

(51) Int. Cl.$^7$ ..................................................... H02G 13/00
(52) U.S. Cl. ............................. 174/3; 174/4 R; 361/138; 361/222
(58) Field of Search ........................ 174/2, 3, 4 R, 174/4 C; 361/117, 137, 138, 212, 216, 220, 222, 231

(56) References Cited

U.S. PATENT DOCUMENTS

| | | |
|---|---|---|
| 4,807 | 10/1846 | L'Anglais . |
| 110,778 | 1/1871 | Munson . |
| 175,933 | 4/1876 | Cole . |
| 356,531 | 1/1887 | Grimes . |
| 369,915 | 9/1887 | Brown . |
| 492,512 | 2/1893 | Hum . |
| 1,164,757 | 12/1915 | Schweitzer et al. . |
| 1,477,304 | 12/1923 | Allcutt . |
| 2,025,338 | 12/1935 | Capart . |
| 2,128,408 | 8/1938 | Grenier . |
| 2,644,026 | 6/1953 | Grenier et al. . |
| 2,815,395 | 12/1957 | Donelli . |
| 3,662,083 | 5/1972 | Constant . |
| 3,919,956 | 11/1975 | Invernizzi . |
| 4,480,146 | 10/1984 | Invernizzi . |
| 4,518,816 | 5/1985 | Robert . |
| 4,540,844 | 9/1985 | Sautereau et al. . |
| 4,565,900 | 1/1986 | Arnau . |
| 4,760,213 | 7/1988 | Gumley . |

FOREIGN PATENT DOCUMENTS

| | | |
|---|---|---|
| 50302/93 | 10/1993 | (AU) . |
| 0 060 756 | 3/1982 | (EP) . |
| 0 139 575 | 10/1984 | (EP) . |
| 0 150 855 | 1/1985 | (EP) . |
| 0 320 358 | 12/1988 | (EP) . |

(List continued on next page.)

OTHER PUBLICATIONS

European Search Report dated sep. 21, 2000.

*Primary Examiner*—Jessica Han
(74) *Attorney, Agent, or Firm*—Renner, Otto, Boiselle & Sklar, LLP

(57) ABSTRACT

Air terminals of two types having curved surface electrodes that act passively or dynamically to minimize or further reduce corona during the close approach of the down leader. In the first type, a fully grounded passive terminal, suitably located and comprising a conductive curved surface of a given radius on a grounded rod of given height, is located and suitably dimensioned in order to minimize corona discharges until the median field rises to a level sufficient to support streamer to leader conversion, as described below. In the second type, dynamic action is achieved by allowing the curved surface to float upwardly in voltage by use of capacitive coupling to the approaching leader. The raising of voltage being in the same polarity as the leader, acts to reduce the electric field immediately above, with consequent reduction in corona. When a flashover point is reached between the curved surface and the main earthed electrode there are provided free electrons in avalanche mode, and the curved surface is simultaneously grounded through the arc. This grounding causes an instant increase in the electric field immediately above the terminal. Streamer formation is enhanced by the liberation of free electrons, the photoionization created by the arc, and the instant increase in the electric field strength ahead of the streamer.

18 Claims, 7 Drawing Sheets

FOREIGN PATENT DOCUMENTS

| | | |
|---|---|---|
| 0 596 775 A1 | 10/1993 | (EP) . |
| 2 343 342 | 1/1978 | (FR) . |
| 2 343 338 | 2/1978 | (FR) . |
| 2 620 581 | 9/1987 | (FR) . |
| 505138 | 4/1976 | (RU) . |
| WO 98/00898 | 1/1998 | (WO) . |

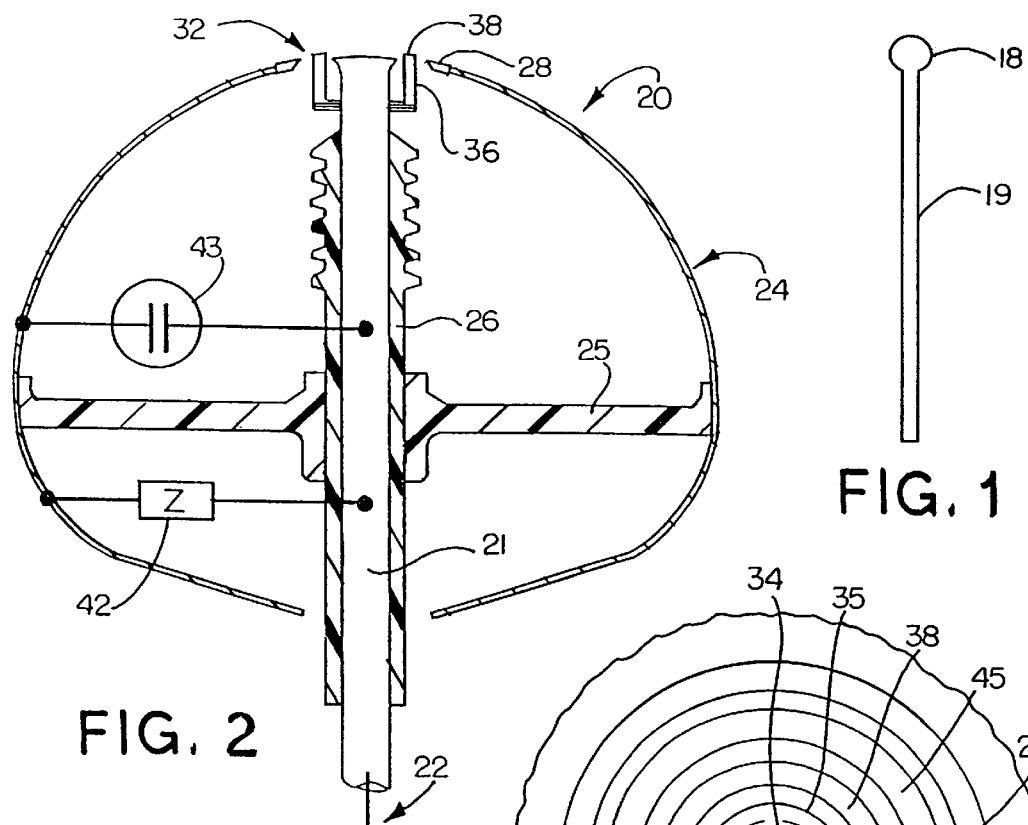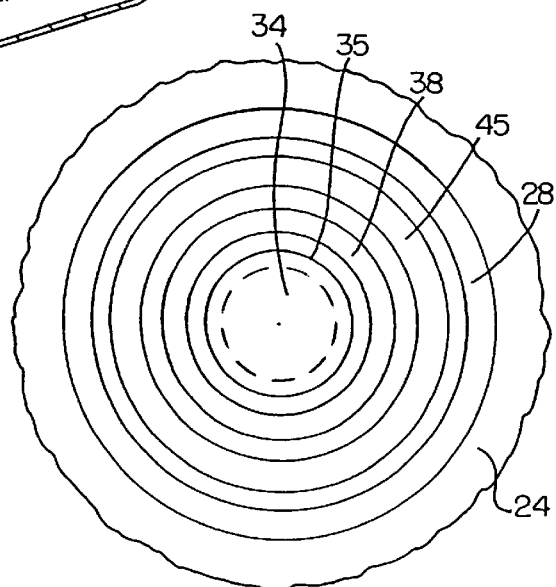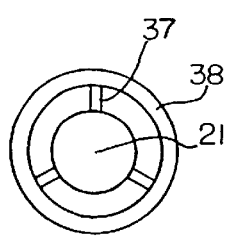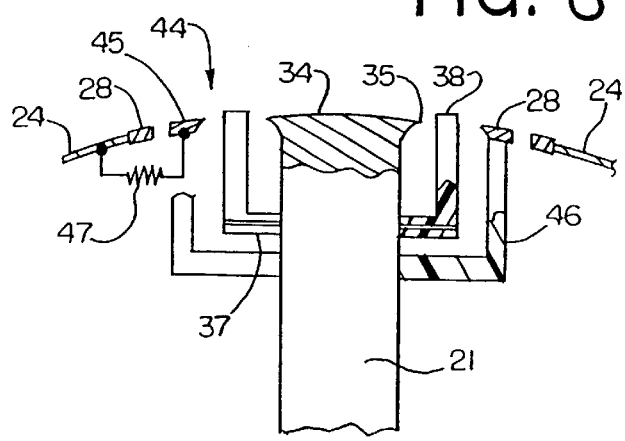
FIG. 1
FIG. 2
FIG. 3
FIG. 4
FIG. 5
FIG. 6

LIGHTNING AIR TERMINALS AND METHOD OF DESIGN AND APPLICATION

This application is a continuation of a provisional application Ser. No. 60/094,280 filed Jul. 27, 1998.

DISCLOSURE

This invention relates generally to lightning protection, and more particularly to lightning air terminals and a method of design and application of such terminals.

BACKGROUND OF THE DISCLOSURE

In the field of practical lightning protection, there is a wide spectrum of technologies currently being used. To the left of this spectrum there are the air terminals claiming enhanced or more consistent performance. Whether these terminals enhance or retard corona development, or whether they are blunt or sharp, they have been broadly categorized under a generic term "ESE" meaning Early Streamer Emission.

In the center of the spectrum there is the conventional practice widely specified in various Standards. This practice currently uses an electrogeometric model known as the "rolling sphere" which was adapted from the electric power transmission industry, and which is based on no electric field enhancement irrespective of air terminal location or configuration. The rolling sphere is notable for gaining credence from measurements taken on transmission lines. These lines are remarkable for their essentially two dimensional aspect and uniformity of height and conductor diameter. It was from this restricted base that the system was unilaterally adapted into the protection of three dimensional and complex geometrical structures.

Within the Standards there is permitted a widely divergent practice. This may vary from clusters of, for example, six (6) meter high so called Franklin rods to much shorter terminals, sometimes called finials, spaced at closer intervals. There are also the systems with no vertical terminals, sometimes called the Faraday system, and which comprises conductors laid horizontally on exposed surfaces.

To the right of the spectrum are the systems that claim absolutely to prevent lightning attachment by the use of arrays of sharp points designed to produce abundant corona. The corona is claimed to weaken the strength of the near electric field and cause the lightning to strike elsewhere.

While none of the above techniques offer perfection, there is room to improve performance of air terminals and their location through better understanding of the attachment process.

There are four phases in the attachment process of lightning to a ground point. The first is the quasi-static phase where electrical fields build below a storm cloud over some tens of minutes. These fields cause ground objects to be electrically stressed and, dependent on their height and geometric shape, they will emit corona. In the case of a negative cloud base, this corona is in the form of positive ions which create a space charge in the near field immediately above the object.

In the longer term, these positive ions, which in reality are molecules of air, ascend with typical velocities of 1 ms$^{-1}$ in the fields of 10 kVm$^{-1}$ and create non-linearity in the field to heights of several hundred meters. Thus, the electric field strength observed at ground becomes modified before any dynamic event occurs with typical values of 50 kVm$^{-1}$ having been recorded as reducing to values below 5 kVm$^{-1}$ near ground.

The second phase relates to the approach of a down leader, a filament discharge with average velocity of 10$^5$ ms$^{-1}$ but with 20–50 µs steps or pauses. The inter-pause velocities can exceed 10$^6$ ms$^{-1}$. This conveyance of charge toward ground causes a rapid increase in the field strength observed by ground points. There is very small initial change in the ground observed electric field strength when the leader is at high altitude, but with near approach, values will be escalating at a typical rate of 10$^9$ Vm$^{-1}$s$^{-1}$.

The third phase is when electric field strength observed by a ground point reaches the critical value to create avalanche breakdown. This commences with an initial corona burst in which streamers can develop, one of which may finally develop into a propagating leader. At this time, factors can be dimensioned such as electric field intensification arising from height and ground electrode curvature. Streamer development fields can also be determined in the laboratory, but up to now the laboratory experiments have not been able to readily model the field decay from the surface to "median" values in the first few meters above a terminal. The "median" or "ambient" field is defined as the unperturbed electric field, i.e., that which would exist in the absence of the object. There is a minimum value of the median field required to convert a streamer into a propagating up leader.

The fourth phase is the continuing propagation of the up leader. Once the root of an up leader is formed, it requires the electric field strength ahead of it to exceed 300–500 kVm$^{-1}$ to gain the necessary energy to continue propagation.

Embedded within the above four phases is another spectrum based on the strength of electric field to cause breakdown of air, the electric field strength required to cause upward emission of filamentary streamer type discharges, and a value of electric field strength required to convert the filamentary discharge into an up leader. The former value is commonly quoted as having a nominal value of 3 MVm$^{-1}$, while the latter value falls within the range 300–500 kVm$^{-1}$. Of course, in nature these values will never be exact.

There is a wide variation in geometric shape of ground points which range from sharp points to flat horizontal surfaces. At one end of the geometric shape spectrum is the so-called pointed Franklin rod. Should this rod produce a field intensification of 1000:1, then 3 MVm$^{-1}$ at the tip is reached when the median field is only 3 kVm$^{-1}$. No streamer development or propagation is possible in such low median fields but a continuing corona emission will provide an ascending space charge of ionoised air molecules in periods long before the initiation of a down leader.

As the center of this spectrum is approached, the field intensification progressively reduces. The center is reached when, for example, a value of 6:1 is achieved. This center of the spectrum would typically be a "blunt" rod which has a rounded upper surface of a given radius (such that the intensification is 6:1). In this case, the field strength at the tip of the rod reaches a corona emission level of 3 MVm$^{-1}$ at the time when the median field reaches the leader propagation level of 500 kVm$^{-1}$.

At the other extreme of this spectrum is a flat surface with unity field intensification. Hence, the down leader needs to approach very close to produce 3 MVm$^{-1}$ at the surface, but when breakdown with corona emission occurs, propagation would not only be absolutely assured, but would most likely be instantaneous.

This spectrum leads to a number of conclusions, namely, that an elevated sharp point becomes unnecessarily active too early in the process, by producing field-reducing corona along with space charge. This blanket of charge particles lying above the grounded point will act as a shield and prevent the point observing the approach of the down leader. The result is that the down leader must approach much closer in order to force the creation of an up leader. It has been discovered that a rounded surface will provide a better performance by minimizing pre-discharge corona and, by suitable radius or diameter dimension, create streamers only when the near and median field can support their conversion to a leader.

Hereafter, three different types of air terminals will be referred to, viz.: (I) A fully grounded conductor as specified in various Standards, i.e., a Franklin rod which is a long cylindrical conductor with a sharp, conical tip, the shorter finial version, or the rodless system of copper tapes commonly known as the Faraday system. Henceforth, these types of air terminal shall be referred to as "conventional passive". (II) A particular type of air terminal comprising a curved conductor, typically a sphere, placed on a conductive rod. The radius of curvature and overall height of this air terminal is dimensioned according to the method to be described. Hereafter, this type of air terminal shall be referred to as "RFI passive", RFI being the acronym for "reduced field intensification". (II) A particular type of curved surface air terminal comprising one or more insulated components which result in a triggering arc to enhance the initiation of the lightning attachment process; henceforth, this type of air terminal shall be referred to as "RFI triggering".

The present invention and method then relate to: (i) significant improvements of Type I lightning air terminals, viz. the Type II terminals, (ii) certain improvements in the Type III system such as that shown in prior Gumley U.S. Pat. No. 4,760,213, and (iii) to a method of design and application of the Type II & III air terminals. Terminals of the type III seen in such patent are widely sold under the trademark DYNASPHERE™ by ERICO Lightning Technologies Pty. Ltd. of Hobart, Tasmania, Australia.

The DYNASPHERE™ terminal utilizes a generally spherical or ellipsoidal curved surface electrode which is connected to the grounded central conductor by a high impedance current drain. An annular air gap is provided between the top of the generally spherical surface and the top of the central grounded conductor. Such lightning air terminals have a number of parameters such as the size and shape of the spherical surface, the size of the air gap, the shape of the tip of the central grounded conductor, the height of the terminal above the structure to be protected, and the location of the air terminal on the structure. One primary parameter is known as the "electric field intensification factor" which is derived from the height and curvature of the curved surface electrode. These factors have never before been defined in relation to practical lightning protection systems.

There is accordingly a need for an improved, curved surface, RFI air terminal which will provide a more slowly decaying intensification across the near and median fields, and which creates a trigger or corona only when there is sufficient energy, particularly in the median field, to progress a streamer into a leader. In this way, the field reducing effect and non-linearities associated with corona and space charge are avoided.

SUMMARY OF THE INVENTION

In the first phase of the invention, a conductive sphere of a given radius is placed on a grounded rod of given height and dimensioned according to design algorithms to be presently discussed. In the next phase of the invention, an improved air terminal has a curved surface electrode supported by insulation on a grounded central rod with a blunt slightly domed tip. A concentric air gap is provided between the top of the central rod and a ring at the top of the curved surface. The surface is designed to have a natural capacitive coupling to an approaching down leader. In order to prevent early sparking or arcing across the air gap due to random ion collection in periods of quasi-static fields due to overhead storm presence, a high impedance/resistance connection is provided connecting the curved surface to ground. Interposed in the spark gap may be the concentric top of a non-conducting ring which projects just proud of the direct or shortest spark or arc line between the curved surface ring and the top of the central rod. This requires the arc to jump over the ring and, in doing so, enter a stronger electric field. In addition to the impedance/resistance connection, a trimming capacitor may also be connected between the curved surface and the central rod or ground to assist in optimizing the timing of the arc triggering.

In another embodiment, the spark gap includes an additional concentric ring outside the non-conducting ring and connected by a series resistor to the curved surface. The combination of the capacitance between the curved surface and the central rod, supplemented by the trimming capacitor and the series resistor forms an RC discharge circuit which may be used to lengthen the duration of the arc triggering. The air terminals of the invention have a number of functional properties. They are positioned, and have a geometric shape, so that they do not produce corona emissions in the quasi-static electric fields before the approach of a down leader. The Type III triggering terminal senses the approach of a down leader and acts in a manner to further reduce the risk of corona generation. It recognizes when the median field has the strength to support up leader formation and its propagation. It then triggers a corona burst when such conditions are met and, simultaneously with the triggering, enhances the immediate electric field to produce streamer emission and streamer to leader conversion under optimum propagation conditions. The terminal also has no batteries, charging systems, radiation, or electronically active components. It is activated solely by energy from an approaching down leader.

The invention includes a method of designing the parameters of the air terminals, some of which are their: (i) height, (ii) curvature of the rounded surfaces, (iii) position on a structure, (iv) size of the Type III floating surface and (v) spark gap length. Parameters (i), (ii) and (iii) are set by 2D or 3D finite element modeling of the electric fields around the air terminal, structure and lightning downleader, and taking into account the critical criteria for upleader initiation and propagation. Parametric computer modeling produces a set of general mathematical relationships, hereafter termed "algorithms", which enable the correct parameters to be selected for each specific lightning protection scenario without the need to perform an "online" analysis of each case. Also, the "attractive radius", "attractive area" or lightning capture volume of the parameter-set air terminal can be determined with respect to a given structure. Parameters (iv) and (v) are set, in conjunction with (ii) determined above, by using a laboratory arrangement which employs a high voltage generator capable of producing a voltage or electric field waveform that accurately simulates the rapidly escalating waveform found in natural conditions. The conventional Marx high volatge impulse generator used for decades for air terminal testing is totally unsuitable for this function.

In combination, the above methods permit the electric field intensification to be determined jointly by height above a grounded surface and the size and curvature of curved surface conductive electrode. The method determines the electric field over and around the structure and provides a height and location for the air terminal so that no (or minimal) corona is formed during the quasi-static period of a thunder storm. The RFI triggering terminal inhibits corona formation even during the early stages of down leader progression, and will trigger the corona and streamers only when the median electric field, which is reached at distances typically ranging from 0.5 meters to about 10 meters beyond the air terminal, is of sufficient strength, typically 300–500 kV/m, to convert astreamer into a propagating leader. The potential on the curved surface and, hence, time at which the triggering takes place is controlled by the size of the spark gap. Because of the rapid escalation in field following the first trigger, repeat triggers occur at rapidly decreasing intervals.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is a fragmentary transverse section of a passive, curved surface air terminal in accordance with the present invention type II ("RFI passive").

FIG. 2 is a fragmentary transverse section of a floating triggering type air terminal in accordance with the present invention type III ("RFI triggering");

FIG. 3 is an enlarged fragmentary view of the upper end of the Type III terminal at the air gap;

FIG. 4 is a top plan view of the insulation ring, the top of which is interposed in the air gap;

FIG. 5 is a view similar to FIG. 3 illustrating an arc time extension ring located in the spark gap and connected to the curved surface by a resistor;

FIG. 6 is a top plan view of the embodiment of FIG. 5;

DETAILED DESCRIPTION OF THE PREFERRED EMBODIMENTS

Figure 7:
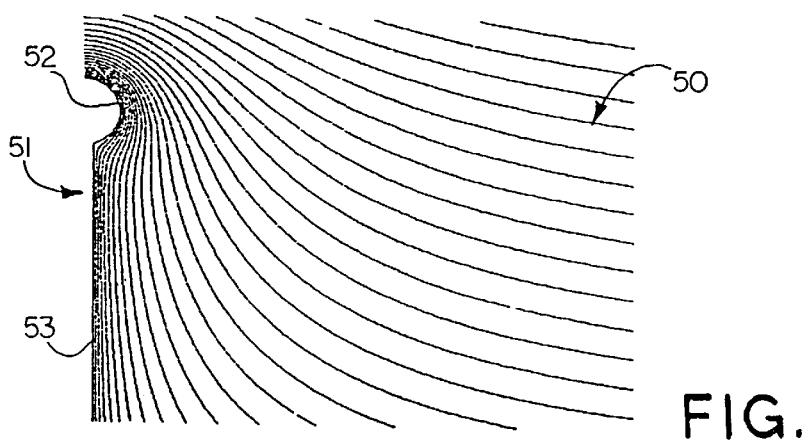
FIG. 7 is a schematic half section showing equipotentials about an air terminal of the type shown and illustrating the decay in intensity as the field returns to the median or unperturbed value.

In the first phase of the invention, a conductive curved surface as seen in FIG. 1, typically a sphere 18, of a given radius is placed on a grounded rod 19 of given height and dimensioned according to design algorithms to be presently discussed. The passive, spherical air terminal so designed and placed may optimize the minimization of corona until the median field rises to a level sufficient to cause a surface discharge in the form of a corona burst. The embedded streamers are subsequently encouraged to develop into propagating leaders in the absence of space charge in the immediate vicinity. This is an improvement on the corona-producing sharp rods in current practice. The invention shows that simple replacement of sharp rods by blunt rods cannot achieve optimum performance and that the algorithms to be discussed are needed to determine the physical parameters according to location on a structure.

Referring now to FIGS. 2–4, there is illustrated a further improvement by way of a triggering air terminal in accordance with the present invention which is activated by energy from an approaching down leader. The air terminal is shown generally at 20 and comprises a central conductive earth rod 21 for lightning attachment and conveyance of the discharge current to ground as indicated at 22. Surrounding the rod is a curved conductive surface 24 which is supported at its widest point by an installation spider 25 extending from insulation sleeve 26. The top of the curved surface is provided with a ring 28 which has an undercut inner edge 29 forming a relatively sharp edge 30 at the top, seen in FIG. 3, which edge is concentric with the central conductor rod 21. The ring 28 forms an annular concentric air gap at the top of the air terminal shown generally at 32.

The top of the conductive rod is at approximately the same elevation and has a blunt configuration formed into a slightly convex, shallow dome, or rounded conical top 34 provided with a relatively sharp horizontally projecting lip 35.

Surrounding the top of the conductive rod is a non-conducting ring or sleeve 36 which is adjustably mounted on the central conducting earth rod as seen at 37. The very tip of the ring indicated at 38 is positioned just proud of the shortest spark track between the top of the central conductor and the ring 28. The tip of the annular non-conducting ring will project preferably from about 1 millimeters to about 2 millimeters above the shortest line of the spark or arc so that the spark must literally jump over the ring tip 38 as indicated at 39 and enter a stronger electric field.

As seen in FIG. 2, there is provided an impedance/resistance unit 42 connecting the outer curved surface electrode 24 to ground through the central rod 21. The purpose of this impedance/resistance unit is to prevent early arcing due to random ion collection in the period of a quasi-static field due to overhead storm presence. Also connecting the outer curved surface electrode to ground through the central rod is a trimming capacitor 43 to assist in optimizing the triggering point.

Although a variety of shapes may be employed, the illustrated shape of the curved surface electrode 24 is similar to an oblate/prolate spheroid with the portion below the insulation spider at the widest point being oblate and the portion above being prolate. The size including the diameter or radius may be substantial as hereinafter noted with the diameter being typically from 50 mm to >1 meter (for very tall structures, there may be a need for diameters >1 meter in order to meet the corona criterion).

Referring no to FIGS. 5 and 6, there is illustrated a modified form of air terminal which includes the grounded central conducting rod 21 having the blunt top 34 and the annular lip 35. The curved surface electrode 24 is provided with the annular ring 28 providing a somewhat larger air gap seen generally at 44. In addition to the non-conducting ring with the projecting tip 38, the spark gap is provided with a second annular conductive ring shown generally at 45. The ring 45 is supported on insulation bracket 46 from the central rod 21 but is electrically connected to the curved surface through a series resistor 47. The ring 45 then becomes an arc time extension ring, and the combination of the capacitance between the surface 24 and the rod 21, supplemented by the capacitance 43 and the series resister 47, will form an RC discharge circuit to maintain the triggering arc for a longer duration.

The preferred air terminals illustrated in FIGS. 2–6 have properties so that they can be positioned and have geometric shapes such that they produce no corona emissions in the quasi-static electric fields before approach of a down leader. The air terminals also sense the approach of the down leader and act in a manner to reduce further the risk of corona generation. The terminals recognize when the median field has sufficient strength to support up leader formation and its propagation and trigger the emission of a streamer discharge when such conditions are met. The air terminals enhance the immediate electric field in conjunction with streamer emission in order to ensure optimum propagation conditions. They require no batteries, charging systems, radiation or electronically active components.

The process of the present invention involves the determination of electric field concentration such as shown in FIG. 7 in a half section for computing simplicity. FIG. 7 illustrates the electric field shown generally by the equipotential lines 50 surrounding an air terminal shown generally at 51. The curved or rounded surface at the top of the terminal is shown at 52, while the central earthed rod is shown at 53. As is apparent, the electric field concentration around the air terminal and about the rounded surface decays in intensity with distance as the field returns to the median or unperturbed value.

Figure 8A:
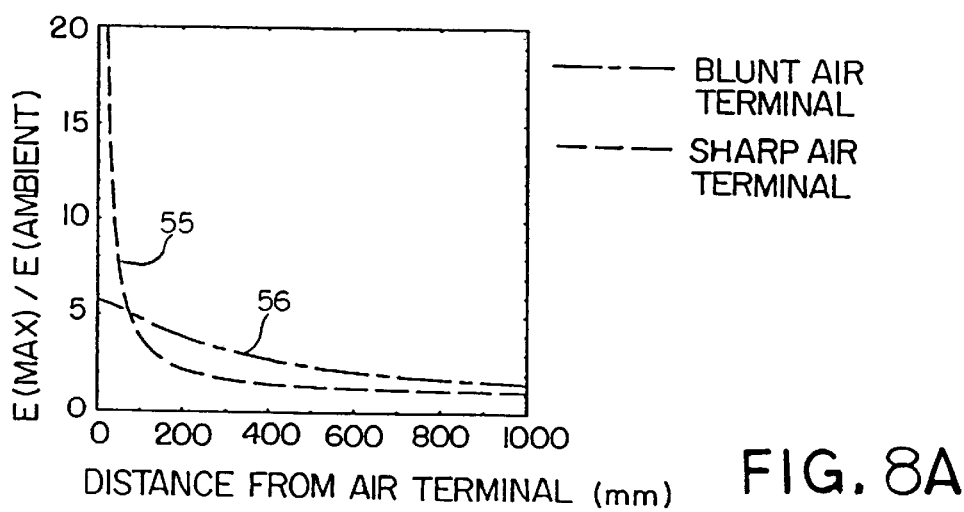
FIG. 8A is an electric field versus distance chart illustrating the electric field decay over distance from the RFI air terminals in the present invention, compared with a sharp, passive air terminal such as a Franklin rod.

FIG. 8A illustrates the importance of this electric field decay with distance from the air terminals with very different field intensification factors. The line 55 represents the decay for a sharp rod such as a Franklin rod, which has a diameter of 6 mm and an overall height of 3 meters. The line 56 represents the decay for a blunt air terminal such as disclosed in FIGS. 1–6, which has a spherical upper surface of radius 0.5 m and an overall height of 2.5 meters. The respective field intensification factors are approximately 600 and 6.

It should be noted that the decay distance to the ambient or median field is not a simple function of the intensification factor. It has a positive dependence on the height and radius of curvature but in different proportions, the height being the dominant factor. However, for a given height above ground, the electric field strength ahead of the terminal with the highest intensification (smallest radius) more quickly decays to the ambient field. Thus, any early formed streamer will find a rapidly decreasing field strength as it emerges from the air terminal tip. Such a streamer would not find sufficient energy in the field to progress into a leader (the amount of energy stored per unit volume in an electric field is in proportion to the square of the field strength). Thus, the streamer would collapse, and continually re-emerge until the down leader approached much more closely to give the required energy for streamer-to-leader conversion. However, a blunt configuration, whether passive or triggering, with the lower field intensification produces a much more linear decay as seen by the curve 56, with field strength remaining above the ambient value out to a much greater distance. This illustrates that a blunt configuration launching a streamer has a greater probability of converting that streamer into a stable, propagating leader, provided it meets the design algorithms to be presently discussed.

Figure 8B:
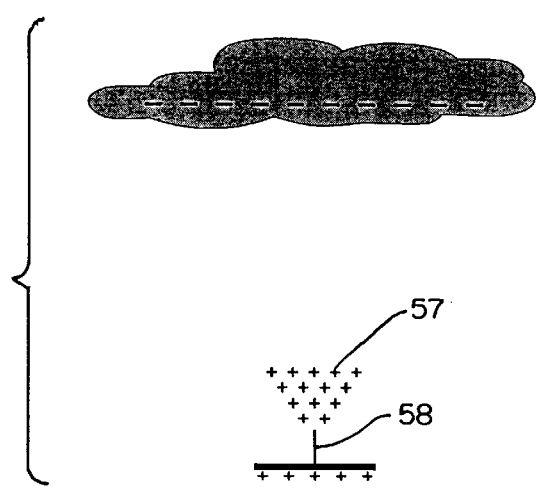
FIG. 8B illustrates schematically the ascending space charge produced from a grounded object that is in corona.
Figure 8C:
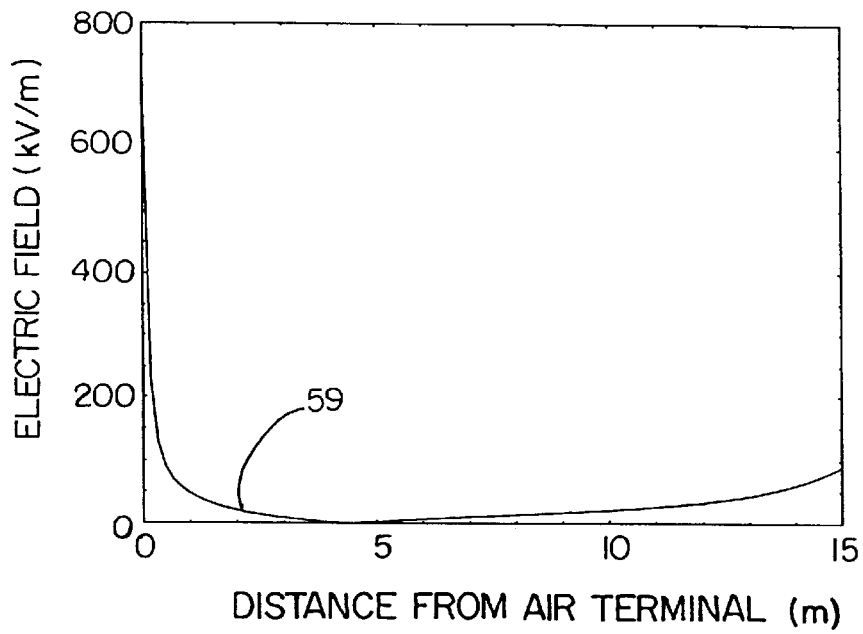
FIG. 8C shows a typical plot of the modified electric field versus the vertical distance from a grounded object due to an overhead space charge volume.

With further reference to FIG. 8A, the sharp rod, with an intensification factor of about 600 to 1, will generate corona at a field strength of 3,000/600 kVm$^{-1}$, i.e. in an ambient field of only 5 kVm$^1$. Thus, a space charge is being formed in those electric fields which exist before any down leader is initiated. As seen in FIG. 8B, the presence of positive ions 57 above a terminal 58 will act to reduce the strength of the normal negative field present below the thunder cloud shown. The effect of space charge in a large terminal-plane gap containing a uniform charge density of ~0.5 $\mu$C/m$^3$, is shown in FIG. 8C. The electric field indicated by the curve 59 is almost completely neutralised at a distance of 4 meters from the terminal. Hence, streamers would never be able to propagate beyond this point. On the other hand, for the blunt rod, which has a 6:1 intensification, the median field of 500 kVm$^{-1}$ needed to sustain leader propagation has been obtained at the moment the surface field at the terminal has reached 3 MVm$^{-1}$. Corona will not only form when the electron avalanche is required to produce a streamer, but additionally will occur when the near field is strong enough to support streamer-to-leader conversion.

In natural conditions, however, the attachment process is a competition between several upward leaders. These competing leaders are not fully independent. Mutual repulsion or quenching of a leader by earlier propagating leaders is observable and may be predicted from finite element modeling. Accordingly, in the design of the system it is important not to ignore other nearby potential cites for upward leader initiation as hereinafter described. With the process of this invention, it is possible to define optimum conditions for lightning attachment and to assess these conditions for all competing points such as building corners and parapets. Thus, one or more air terminals of correct proportion can be located to provide superior performance over any nearby competing point.

Figure 9:
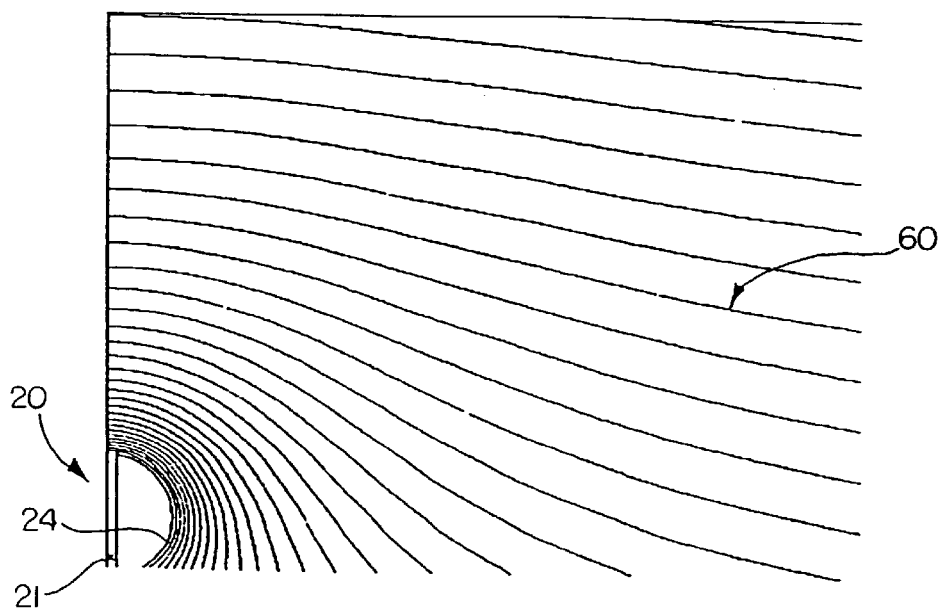
FIG. 9 illustrates the equipotentials around an air terminal of the invention under triggering conditions where all elements are effectively grounded.
Figure 10:
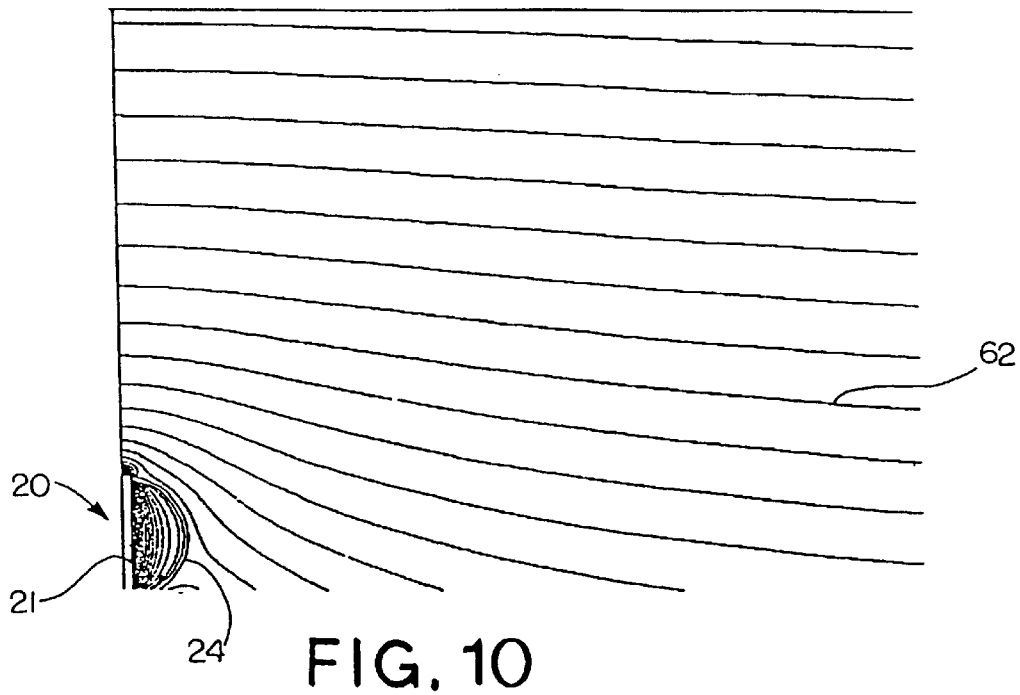
FIG. 10 illustrates a RFI terminal and the equipotentials with an approaching down leader.
Figure 11:
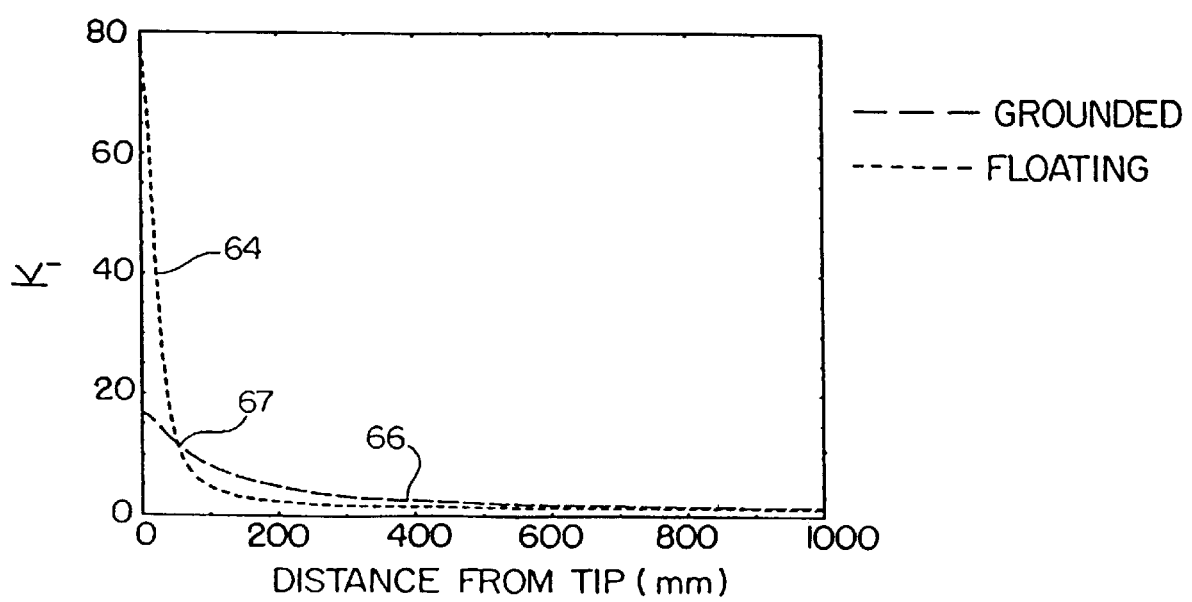
FIG. 11 is a chart of the invention in its two modes of operation, namely grounded and floating, where the field strength over distance is compared.

Referring now to FIGS. 9, 10 and 11, FIG. 9 illustrates the equipotential lines 60 of the electric field distribution around the terminal 20 under the static conditions where all of the elements are effectively grounded.

Referring now to FIG. 10, there is illustrated a typical electric field observed by a ground point below a descending down leader. The electric field lines of equipotential are shown at 62. Under natural conditions, when the median field reaches the order of 500 kVm$^{-1}$, there is observed a field rising at typical rates of 10$^9$ Vm$^{-1}$ sec$^{-1}$. The natural electric field increase due to the approaching down leader is illustrated in the graph of FIG. 11. The capacitive coupling between the floating surface 24 and the down leader charge, plus the restriction placed on the flow of displacement currents through the impedance/resistance 42 means that the surface of the curved surface electrode 24 will rise in voltage, or float upwardly in voltage. FIG. 10 illustrates the equipotentials around an air terminal of the invention with a grounded rod and a floating curved surface electrode, elevated in potential due to the capacitive coupling to an approaching down leader.

In comparing FIGS. 9 and 10, it should be seen that there is a reduction in field strength above the terminal at the point in time when the down leader is approaching. This reduction in field strength results in the preclusion of extensive surface corona from the terminal during the initial dynamic phase of the leader approach.

In FIG. 11, there is illustrated the field reduction with distance for the grounded and floating conditions described in connection with FIGS. 10 and 11. It is to be noted that within 100 millimeters there is a stronger field for the floating surface electrode illustrated at 64, but thereafter the field reduces to prevent any streamer growth. Conversely, the electric field at the surface 24 will always be lower in the floating state. The floating curve 64 crosses the grounded curve 66 at 67 which is within the first 100 millimeters from the tip. The field above the terminal is noticeably less than would be found in a grounded state under the same median field conditions. The raising of the potential of the curved surface therefore acts to reduce the chance of extensive corona formation during the down leader approach. When the surface 24 has reached some tens of kV, there will be a sparkover at the annular ring. The sparkover creates three key benefits, the first being to create free electrons at the point of highest electric field strength. Secondly it will assist electronic acceleration through the process of photo ionization, and finally the spark itself is a conductor, and in discharging the conductive surface 24, acts to ground that surface through to the central rod. This shifts the air terminal from one curve to the other as seen in FIG. 11, and results in an immediate increase in the near field. In this manner, the conditions are then ideal to initiate and propagate an up leader.

The ideal parameters of the air terminal of the present invention are determined primarily through two means: (A) computer modelling of electric fields using 2D and 3D finite element analysis, and (B) laboratory tests using a monotonically increasing or "concave" field which simulates the natural lightning strike. Method (A) is used to determine the correct height and curvature of the floating conductive surface and method B is used to determine the correct area of the surface and the size of the triggering air gap. The objective of both methods, in combination, is to create a trigger at a time when both the rate of rise of electric field and the median electric field are simulating the ideal propagation conditions as would be found in nature.

Figure 12:
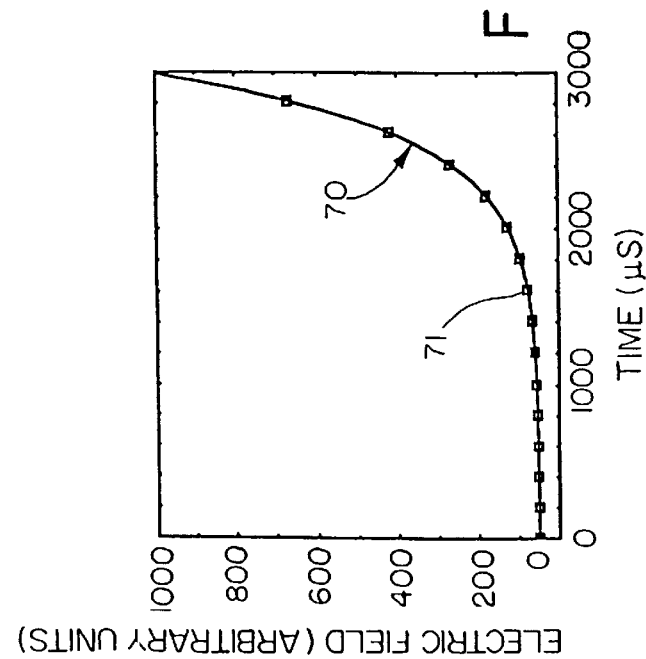
FIG. 12 illustrates a simulation of a natural lightning strike showing the electric field over time and the exponential increase in field strength upon the approach of a down leader.

With respect to method (B), the concave curve 70 of the required electric field is seen in FIG. 12. The curve 70 is obtained by the generator shown schematically in FIG. 13 as hereinafter described. The generator illustrated is capable of precisely simulating the electric field due to a lightning down leader, even including the well known steps or pauses as the leader progresses toward its point of attachment near the ground. The steps or pauses, smoothed out, are illustrated by the points 71.

Heretofore, a Marx generator has been used for laboratory studies, but for this purpose a Marx generator is unsuitable since the wave form is the antithesis of the natural wave form. The Marx generator produces a "convex" waveform with the highest dV/dt at t=0, and the air terminal under test will experience the highest capacitive coupling when the median field is virtually 0. In this manner, a trigger discharge can occur too early and leave a residual space charge to act against future streamer emission. Accordingly, a generator must be employed which in effect duplicates the monotonically increasing field which simulates nature as seen in FIG. 12. Such a generator is shown in FIG. 13.

Figure 13:
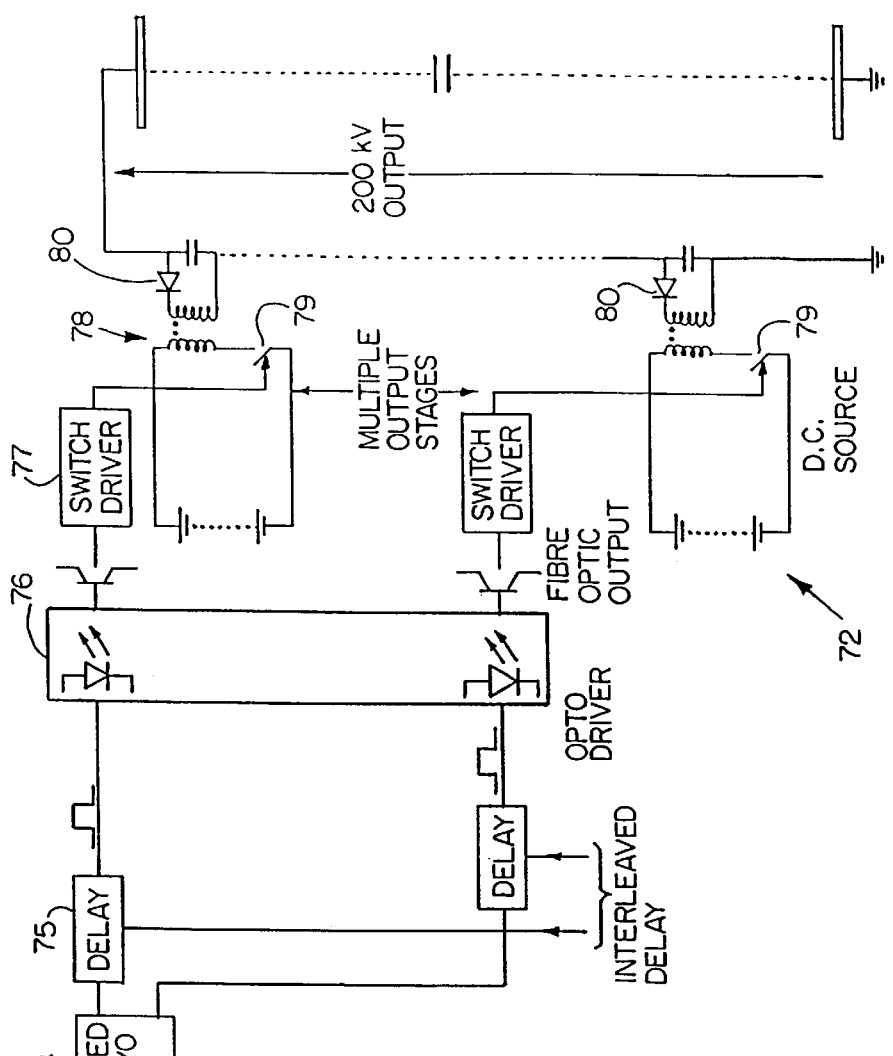
FIG. 13 schematically illustrates a generator which may be used to obtain the simulation seen in FIG. 12 which can then be used in finite element modeling to optimize parameters of the air terminal.

Referring now to FIG. 13, there is illustrated a high voltage generator shown generally at 72. A computer 73 is installed with a high speed digital I/O card unit 74 which is used to output a 10-bit data word which is a pulse width modulated (PWM) representation of the rate of rise of a point on the desired wave form. Typically, the PWM frequency is 100 kHz and the data rate is 2 MHZ. This enables a PWM resolution of about 5%. Hence, it allows delays indicated at 75 to be inserted between each bit in the data stream in 5% steps in order to create a ripple effect increasing the slope between the points 71.

Each delayed bit of output data is passed through opto-driver 76 to into one of ten opto-driven cables shown and then passed into an isolated switched-mode power supply (SMPS) with its own floating DC power supply, shown generally at 76. The fiber optic signals are converted back to electrical form inside each SMPS.

The output stage of the generator uses transformers shown generally at 78 configured in a flyback topology to eliminate the need for output inductors. When the transformer primary winding switches 79 are activated by the amplified SMPS outputs, the primary side of each transformer acts as an inductor due to the blocking action of the output diode 80. When the switches are deactivated, the voltage reverses, and the inductive energy stored in the primary is released through the secondary winding. The output diode 80 then acts so that a negative voltage appears on each output.

Rise times greater than 1 kV/µs are achievable with the illustrated system. The advantage of series stacking the modules comprising the generator is that each module only needs to be able to output a voltage of $V_{out}/n$ and, more importantly, output it at a rate of only 1/n of the required slew rate, where n is the number of modules. An additional benefit of increasing the number of modules is that the ripple affect from the interleaving is smoothed even further. It will thus be appreciated that only the two outside modules are illustrated in the schematic FIG. 13, while the intermediate modules are not shown but otherwise the same.

Other advantages of the generator are that the test waveform can be changed from concave, to linear, to convex in a relatively short period of time (on the order of minutes) so that empirical corrections for variations in temperature, pressure and humidity are not needed. With the computer, the wave shapes can be stored and recalled at any time to repeat a test. The air terminals are tested in laboratory rigs using an overhead screen and can accordingly simulate natural lightning strikes on air terminals from various elevations and azimuth with the near and median fields being determined.

With the illustrated generator, a person skilled in the art may produce a field strength across the gap between the air terminal of the type illustrated and a test electrode which will be equal to the leader progression field, and simultaneously achieve a field rate of rise to match that of nature. The size of the annular spark gap 32 may then be set according to the surface area (capacitance) of the floating surface and the value of the surface to rod capacitance 42.

With respect to method (A), computer modelling of the electric fields at the surface and around the air terminal in the invention, using the finite element method (or an equally applicable technique such as the charge simulation method), has resulted in a set of "non-linear scaling laws", "parametric models" or "mathematical algorithms" which can be applied to any particular lightning protection scenario such that the up leader criteria are met. This was achieved via a parametric study of the field intensification factor as a function of the: (i) air terminal height, (ii) air terminal surface curvature and size, and (iii) distance from the air terminal under static (grounded) and dynamic (floating) conditions. As an example, a parametric model for computing the field intensification factor $K_i$ of a spherical air terminal of a given height h and radius of curvature r is:

$$K_i = 1.44(h/r)^{0.866} + 1$$

The broadest application of the method of the present invention requires knowledge of the local site parameters which must include all structural elements deemed to be in competition with an optimized and ideally placed air terminal. This involves a much more extensive series of parametric studies, which give the field intensification factor as a function of each variable as well as combinations of variables. General algorithms have been derived and used to compute the correct air terminal parameters and the location on the structure to be protected. The algorithms cover a variety of physical principles relating to the field intensification factor. These include the: (i) variation of the field intensification factor with the height, width and distance in the x, y and z directions for rectangular and cylindrical structures as well as simple aggregate structures of this type; (ii) combined field intensification factor of air terminal plus structure, as a function of structure shape, height, width and distance in three dimensions; (iii) combined field intensification factor of any other projections on a structure (e.g., parapets, masts, communications antenna, etc), as a function of structure shape, height, width and distance in three dimensions; (iv) effect of the proximity of another object on the field intensification factors in (i), (ii) and (iii); and the electric field at different locations due to a down leader approaching from different directions, located at different heights and carrying different quantities of electric charge.

Figure 14:
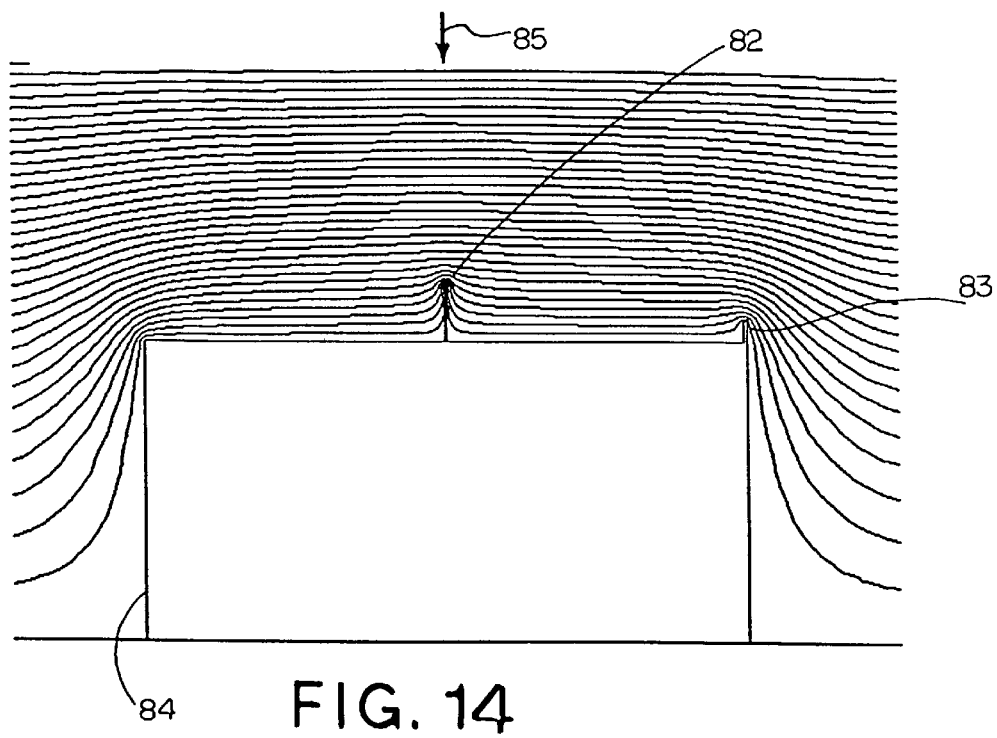
FIG. 14 is a plot of equipotentials around a model of a structure having a parapet with a vertically descending leader.
Figure 15:
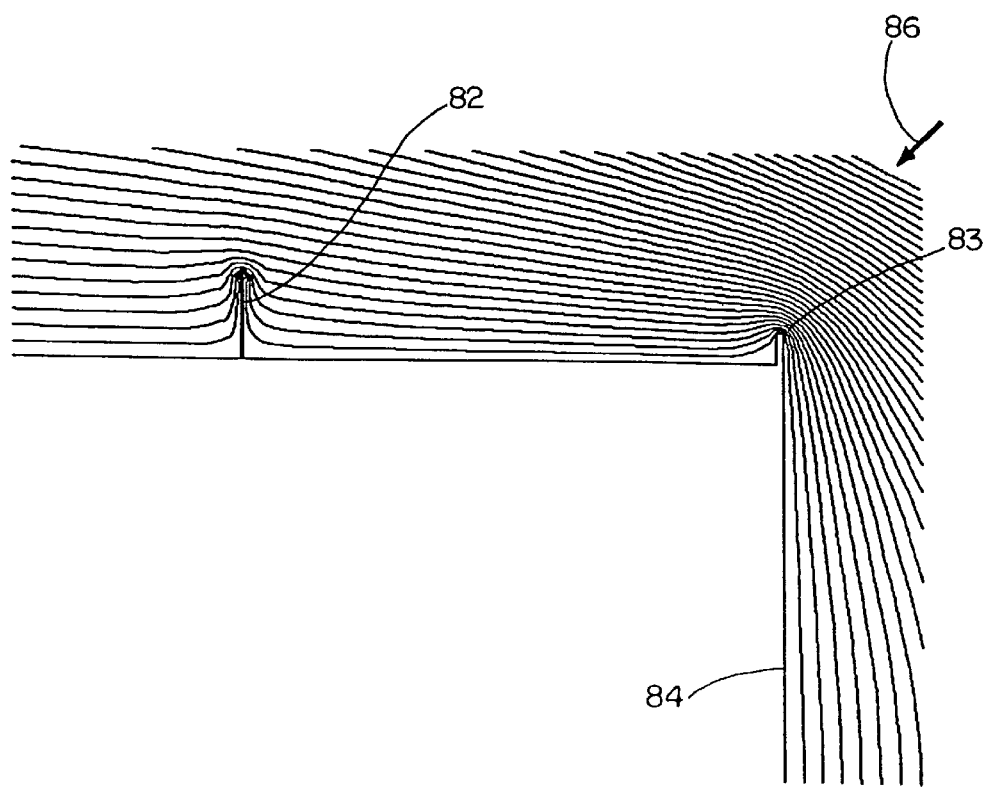
FIG. 15 is a similar plot on a slightly enlarged scale with the down leader approaching obliquely from the right.

A typical result is shown in FIG. 14 where an air terminal 82 is placed away from a competing parapet 83 on a rectangular structure 84. In this case, the median field may be the optimum for sustained leader propagation, such as 500 kV/m and the terminal height and radius adjusted to meet the ideal streamer launch parameters. Likewise, the near fields of the parapet 83 may be computed to find whether they exceed the optimum, and in which case, the terminal should be moved closer to the parapet to regain dominance. In FIG. 14, the illustrated plot of equipotentials around the structure 84 in the yz plane of the 3D model is for a vertically descending leader as indicated by the arrow 85. However, in FIG. 15, the plot of equipotentials around the structure is with the down leader approaching obliquely from the right as seen by the arrow 86.

Figure 16:
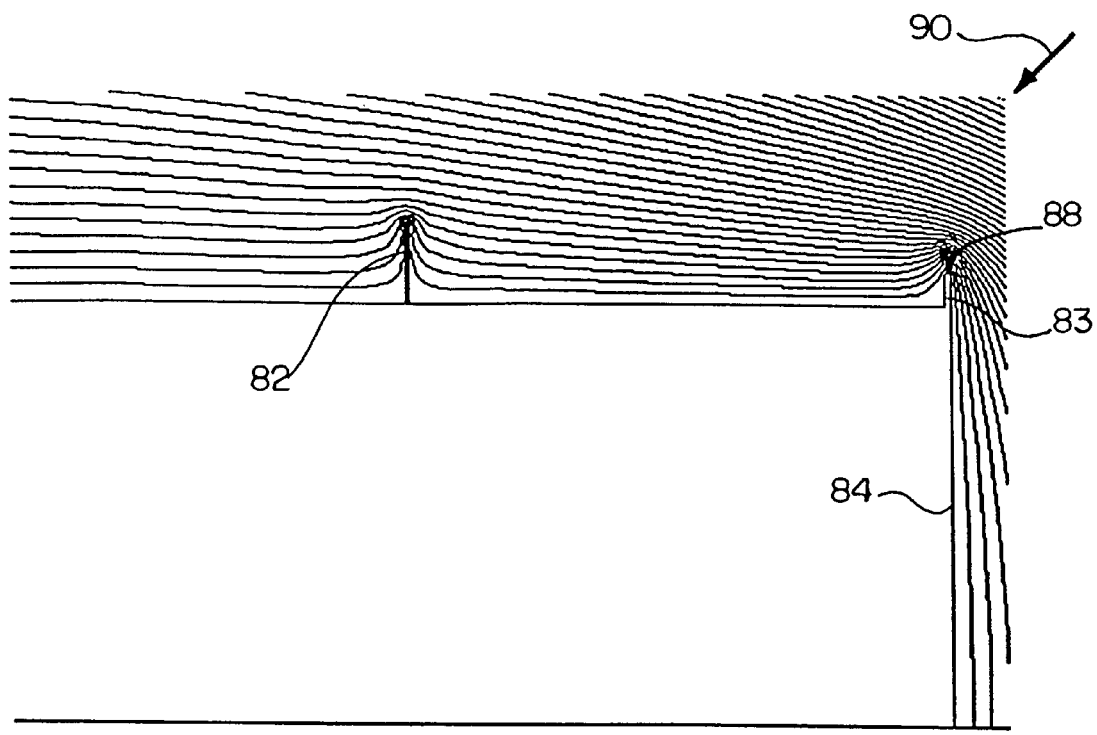
FIG. 16 is a view as FIG. 15, but with an air terminal positioned on the parapet with the selected height and radius providing an ideal attachment point for obliquely approaching lightning.

In FIG. 16, there is shown another method where the equipotentials of the electric field around a structure 84 are determined, and in addition to the air terminal 82 there is provided an air terminal 88 on the parapet 83. The equipotentials are shown with an obliquely approaching down leader illustrated at 90. The air terminal is placed near a corner parapet with suitable height and radius to be an ideal attachment point for the obliquely approaching lightning down leader.

Accordingly with the finite element modeling of the near and median field intensification with down leaders approaching from various directions and with different electrical charges, a suitable optimal system can be developed for the structure.

For the ideal air terminal the height projecting above the structure may be from about 1 meter to 6 meters or even higher. Also the size or curvature of the curved surface electrode may vary from about 50 mm in diameter to in excess of 1.5 meters in diameter. A preferred range is from about 0.5 meters to about 1 meter in diameter. The distance to the median field for these configurations is in the range 0.5 to 10 meters.

In any event, an air terminal is provided with a curved surface electrode acting dynamically to minimize and further reduce corona during the close approach of a down leader. This is achieved by allowing the curved surface to float upwardly in voltage by use of a capacitive coupling to the approaching leader. The raising of the voltage in the same polarity as the leader acts to reduce, on average, the electric field in the vicinity of the air terminal. This acts to eliminate or substantially reduce corona in the dynamic phase of leader approach. When a flashover or spark point is achieved between the curved surface and the main central earthed electrode, there are provided free electrons in avalanche mode, and the curved surface is simultaneously grounded through the arc. The grounding causes an instant increase in the electric field above the terminal at a time when there is virtually no space charge effect. Streamer formation is enhanced by the liberation of free electrons, the photoionization created by the arc, and the instant increase in the electric fields ahead of the streamer. In the dynamic phase during the near approach of a down leader, the E field is intensified so as to have a field strength sufficient to cause a corona and on-going development into a streamer without the impediment of an intervening space charge.

The air terminal is designed so that a streamer is only launched when both the near field and the median field strength, within a few meters of the terminal, are sufficiently strong to convert an initiating streamer into a propagating leader. The height and curvature of the terminal determines the E field intensification factor, and up leader conversion is assured, and the process is enhanced by propagation into an electric field devoid of distortions due to corona emissions in the form of space charges. The invention also includes a method to simulate natural lightning strike conditions and control not only the position of the lightning ground attachment, but also the ideal air terminal parameters to achieve the proper initiation of the streamer and up leader conversion. The system recognizes that there may be other structural points competing to be first launched leader and compares all points on approach of down leaders using a computer analysis involving three dimensional computer finite element modeling.

The overall system differentiates from the industry generic term of "early streamer emission" in that such terminals become active far too early and produce space charge from failed attempts to launch streamers. This invention more properly relates to the term "controlled streamer emission" by holding off streamers until leader conversion and propagation conditions are optimized.

To the accomplishment of the foregoing and related ends, the invention then comprises the features particularly pointed out in the claims, these being indicative, however, of but a few of the various ways in which the principles of the invention may be employed.

What is claimed is:

1. An air terminal including a curved conductive surface capacitively spaced from a permanent grounded upper central rod, said curved conductive surface having shape and size to optimize the formation of surface corona and streamer only when the median field strength is sufficient to support streamer to propagation of a leader, the curved surface being insulated from said central grounded rod, with an annular air gap there between which acts as a spark gap, an electronic circuit joining the curved conductive surface to ground and, in conjunction with the calculation of the capacitive leader coupling according to the dimension of the conductive surface, and having a value such that in a rising electric field of between $10^8$ $Vm^{-1}s^{-1}$ and $3\times10^9$ $Vm^{-1}s^{-1}$ the terminal will allow triggering of an arc at the annular air gap, but at lower rates of rise of electric field prevent such a triggering arc.

2. An air terminal as set forth in claim 1 wherein said electronic circuit comprises a resistance element or a complex impedance which provides a high resistance DC coupling between the grounded upper central rod and the curved conductive surface.

3. An air terminal as set forth in claim 2 where the resistor or impedance value is selected to allow randomly collected ions on the curved surface to drain to ground during the quasi-static phase of a storm, thus effectively grounding the curved surface and minimizing corona formation in both the quasi-static and more distant down leader approach phases.

4. An air terminal as set forth in claim 1 wherein said electronic circuit senses the flow of displacement currents between the conductive surface and ground, the currents being of a magnitude dependent on the rate on electric field change; there being a magnitude when the circuit latches into the open circuit mode causing the conductive surface rapidly to rise to a voltage sufficient to cause flashover at the annular air gap.

5. An air terminal as set forth in claim 1 wherein said electronic circuit includes a shunt capacitance parallel to a bleed resistor in order to optimize the energy in the triggering arc.

6. An air terminal including a curved conductive surface capacitively spaced from a permanent grounded upper central rod, said curved conductive surface having shape and size to optimize the formation of surface corona and streamer only when the median field strength is sufficient to support streamer to propagation of a leader, the curved surface being insulated from said central grounded rod, with an annular air gap there between which acts as a spark gap, an annular ring located within the spark gap but insulated from both the ground rod and the curved surface, and a resistance or impedance means connected between the curved surface and the annular ring, operative to extend the time duration of the triggering arc.

7. A lightning air terminal comprising a central earth rod, a curved conductive surface surrounding said rod and insulated from the rod, an air gap between the surface and the rod acting as a spark gap, a non-conducting ring projecting into the spark gap, and projecting proud of the shortest spark track to deflect the spark upwardly to enter a more intense electric field during storm conditions.

8. A lightning air terminal comprising a central earth rod, a curved conductive surface surrounding said rod and insulated from the rod, an air gap between the surface and the rod acting as a spark gap, a non-conducting ring projecting into the spark gap, and projecting proud of the shortest spark track to deflect the spark upwardly to enter a more intense electric field during storm conditions, and an arc time extension ring means between said non-conducting ring and said curved surface.

9. An air terminal as set forth in claim 8 including a resistor connection between the arc time extension ring means and the curved conductive surface.

10. An air terminal as set forth in claim 9 including a trimming capacitor between the curved surface and rod.

11. A lightning air terminal comprising a central earth rod, a curved conductive surface surrounding said rod and insulated from the rod, an air gap between the surface and the rod acting as a spark gap, a non-conducting ring projecting into the spark gap, and projecting proud of the shortest spark track to deflect the spark upwardly to enter a more intense electric field during storm conditions; and means to adjust the position of the non-conducting ring along the central earth rod to control the extent of deflection of the spark.

12. A lightning air terminal comprising a central earth rod, a curved conductive surface surrounding said rod and insulated from the rod, an air gap between the surface and the rod acting as a spark gap, a non-conducting ring projecting into the spark gap, and projecting proud of the shortest spark track to deflect the spark upwardly to enter a more intense electric field during storm conditions, wherein the top of said central earth rod is blunt and contoured to minimize electric field intensification.

13. An air terminal as set forth in claim 12 wherein the top of the central earth rod is slightly domed.

14. A lightning air terminal comprising a central earth rod, a curved conductive surface surrounding said rod and insulated from the rod, an air gap between the surface and the rod acting as a spark gap, a non-conducting ring projecting into the spark gap, and projecting proud of the shortest spark track to deflect the spark upwardly to enter a more intense electric field during storm conditions, and wherein the top of the central earth rod forms an annular laterally projecting sharp lip.

15. A lightning air terminal comprising a central earth rod, a curved conductive surface surrounding said earth rod and insulated from the rod, an air gap between the surface and the rod acting as a spark gap, and an arc time extension conducting ring means positioned in said air gap between said surface and said earth rod operative to extend in time the formation of a spark.

16. A lighting air terminal as set forth in claim 15 including a non-conducting, insulating ring between said arc time extension conductive ring means and said central earth rod projecting proud of the shortest spark track to deflect the spark track upwardly to enter a more intense electric field during storm conditions.

17. An air terminal as set forth in claim 16 including means to adjust the position of the non-conducting, insulating ring along the central earth rod to control the extent of upward deflection of the spark.

18. An air terminal as set forth in claim 15 including a resistor connection between the arc time extension ring means and the curved conductive surface.

* * * * *